United States Patent Office 3,094,553
Patented June 18, 1963

---

3,094,553
PROCESS FOR THE PRODUCTION OF α-AMINO-β-HYDROXY-CARBOXYLIC ACIDS
Heinrich Hellmann and Helmut Piechota, both of Tubingen, and Hans Henecka and Helmut Timmler, both of Wuppertal-Elberfeld, Germany, assignors to Farbenfabriken Bayer Aktiengesellschaft, Leverkusen, Germany, a corporation of Germany
No Drawing. Filed June 16, 1960, Ser. No. 36,687
8 Claims. (Cl. 260—471)

For the production of the physiologically important α-amino-β-hydroxy-carboxylic acids such as serine, phenyl serine or threonine, numerous methods of synthesis are available giving, however, in most cases, unsatisfactory yields. Moreover the hitherto used syntheses are, in general, inapplicable.

Of the known syntheses of α-amino-β-hydroxy-carboxylic acids, the synthesis of serine according to King (Am. Soc. 69, 2738 [1947], United States Patent No. 2,530,065 [1950]) by the aldol addition of formaldehyde to acetamino-malonic ester and subsequent saponification of the addition product may be the simplest one. This synthesis, however, is limited to the production of serine only, since other aldehydes than formaldehyde do not react with acetamino-malonic ester under the conditions indicated by King; even when replacing formaldehyde by acetaldehyde King's synthesis does not work. Moreover, conversion of the acetylamino-hydroxy-methyl-malonic acid ester initially formed in King serine synthesis is rather cumbersome; it is first saponified in an alkaline medium and then, without isolating the primary saponification product, upon acidification further saponified in an acid solution to give the serine; the serine hydrochloride has then to be separated from the salt-rich evaporation residue with hot alcohol, esterification occurring simultaneously forming the serine ester so that in order to obtain the free serine another acid saponification is required.

It has now been found that a generally applicable and simple synthesis yields α-amino-β-hydroxy-carboxylic acids by reacting acylamino-malonic acid monoester in an alkaline medium with aldehydes, and converting in conventional manner the α-acylamino-β-hydroxy-carboxylic acid esters thus formed into α-amino-β-hydroxy-carboxylic acids.

The reaction according to the present invention may be illustrated by the following scheme

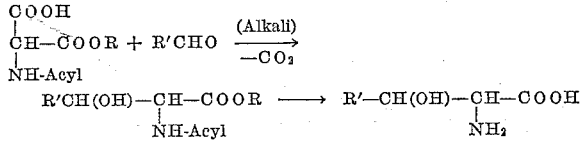

In the above scheme R denotes methyl or ethyl groups. R′ denotes hydrogen, any desired straight-chain or branched-chain saturated or unsaturated alkyl radicals, cycloalkyl radicals, aryl or aralkyl radicals which may also be substituted in any desired manner, or heterocyclic aryl radicals.

The aldol additions may be carried out in the presence or absence of solvents or diluents. When starting from free acylamino-malonic ester acids, the process is advantageously carried out in a methanolic or ethanolic solution in the presence of a molar amount of an organic tertiary base such as trimethyl or triethyl amine. It is, however, also possible to operate in an aqueous or aqueous-alcoholic solution with optional addition of further water-soluble solvents or diluents, this being especially expedient when dispensing with a previous isolation of the free acylaminomalonic ester acid and working immediately with the aqueous-alcoholic solution of the alkaline metal salt obtained by treating an alcoholic suspension of an acylamino-malonic acid dialkyl ester with the amount of an alkali hydroxide solution required for saponification of one of the carbalkoxy groups. A weakly alkaline reaction of the reaction solution is essential, which may be attained by the addition of a small quantity of an alkali metal hydroxide or an alkali metal carbonate.

The addition of aldehydes to salts of acylamino-malonic ester acids according to the invention proceeds in such a manner that the decarboxylation of the anion of the acylamino-malonic ester acid is combined immediately with the aldol addition, since the carbeniate anion formed by the decarboxylation simultaneously functions as methylene component of the aldol addition so that the transition state of the reaction may be formulated as follows:

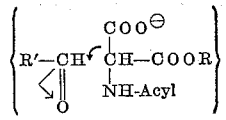

If, however, the acetamino-malonic acid diethyl ester is used according to King, a proton extraction becomes necessary in order to activate this ester to form primarily the methylene component of the addition to form the corresponding carbeniate anion

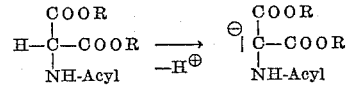

The fact that such an activation occurs with more difficulty than the reaction according to the invention, explains that King's synthesis is limited to the highly reactive formaldehyde, whereas the reaction according to the present invention being a generally applicable synthesis.

Suitable acylamino-malonic acid monoester are chiefly the formyl- or acetylamino-malonic acid-monomethyl or monoethyl esters, without limiting the result of the reaction to the use of the aforesaid compounds as reaction components; thus, for example, the corresponding benzoyl-amino-malonic acid monoesters may also be used.

A special feature of the reaction of the invention is its general applicability with regard to the aldehyde component. Examples of aldehydes to be used are aliphatic aldehydes such as formaldehyde, acetaldehyde, propionaldehyde, butyr- or isobutyraldehyde, unsaturated aldehydes such as crotonaldehyle, higher fatty acid aldehydes such as enanthal or hexadienal, alicyclic aldehydes such as hexahydrobenzaldehyde or 2,5-endomethylene-Δ³-tetrahydrobenzaldehyde, aromatic aldehydes such as benzaldehyde, naphthaldehydes, heterocyclic aldehydes such as furfural or pyrindinaldehydes which, moreover, may be substituted in any desired manner.

The reaction according to the invention already proceeds at a satisfactory rate at ambient temperature. It is also possible to operate at a lower temperature when using e.g. aldolisable aldehydes, but in order to increase the reaction according to the invention at elevated temperatures, i.e. at 30 to about 100° C.

The β-hydroxy-α-amino-carboxylic acids $$R—CH(OH)—CH(NH_2)—COOH$$

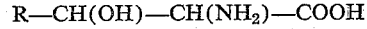

formed according to the invention with the use of aldehydes R—CHO may occur in two diastereomeric forms. By an appropriate selection of the solvate system in each case, the preponderant formation of the desired form may be brought about. The solvate system most suitable for a desired reaction according to the invention has to be determined in each case by special experiments. Since the appropriate reaction conditions may be modified within a wide range, conditions may be established in which an α-amino-β-hydroxy-carboxylic acid according to the invention may be obtained chiefly in the desired diastereomeric form.

The α-amino-β-hydroxy-carboxylic acids obtainable according to the process of the invention may be used as such for pharmaceutical purposes; furthermore, they are valuable intermediates for the synthesis of other therapeutical agents.

The following examples are given for the purpose of illustrating the invention.

*Example 1*

17.5 g. (0.1 mol) of acetamino-malonic acid-monomethyl ester are suspended in 20 g. (0.4 mol) of a 40% aqueous formaldehyde solution and treated in portions with 10 g. (0.1 mol) of triethyl amine. After shaking for a short time, the suspended ester dissolves with a rise of temperature and slight evolution of gas. The mixture is then allowed to stand at room temperature for 24 hours.

The pale yellow solution formed is evaporated down on a water bath under vacuum to give a clear syrup which is dissolved in 50 cc. of concentrated aqueous HCl and boiled under reflux for one hour. The colour of the solution becomes brownish. The solution is subsequently evaporated down in vacuo on a water bath to give a brownish syrup strongly permeated with crystals. After dissolving it in a little water and treating with concentrated NH₃ to a pH of 8-9, the product is evaporated down in vacuo on a water bath to form a pale brown crystal mass. This in turn is dissolved in a little water and boiled for 20 minutes with an addition of animal charcoal. It is then filtered off and the warm dark brown filtrate is carefully sprayed with ethanol until separation of a brownish yellow crystalline substance is recognizable. The product is cooled to −20° C. within 30 minutes, filtered off with suction, and the crystalline filter residue is washed once with very little cold water, then twice with a large amount of alcohol and finally twice with absolute ether.

The yield of the pale yellowish crystalline DL-serine amounts to 7.2 g. corresponding to 72% of the theoretical. The product is paper-chromatographically pure. Only traces of chlorine ions are detectable with AgNO₃.

*Example 2*

17.5 g. (0.1 mol) of acetamino-malonic acid-monomethyl ester are suspended in 20 g. (about 0.5 mol) of acetaldehyde and treated in portions with 10.0 g. (0.1 mol of triethyl amine. The temperature of the reaction mixture rises and the suspended semi-ester dissolves. After standing for 60 hours at room temperature, the colour of the solution has turned into a dark brown. Triethyl amine and excess acetaldehyde are evaporated off on a water bath in vacuo, the remaining dark-brown syrup is treated with twice its volume of concentrated aqueous HCl and boiled under reflux for one hour. The mass is subsequently evaporated down in vacuo on a water bath to form a dark brown oil which, dissolved in a little water, is treated with concentrated aqueous NH₃ to a pH of 8.

The oil obtained by renewed evaporation on a water bath in vacuo, is dissolved in a little water. After an addition of animal charcoal, the solution is boiled for 20 minutes, filtered and slowly treated with a large excess of absolute ethanol. Upon standing with cooling for 16 hours, crystals separate from the clear, red-brown solution. The product is filtered off with suction, the filter residue washed twice with absolute ethanol and subsequently once with absolute ether.

The yield of crystalline, nearly colourless crude threonine amounts to 6.3 g. corresponding to 53% of the theoretical, referred to acetamino-malonic acid monomethyl ester. According to paper-chromatography the product is pure but for slight traces of glycine. Only traces of chlorine ions are detectable with AgNO₃.

Microbiological tests have established that the product obtained by this method consists of 95% of D,L-allo-threonine and 5% of DL-threonine.

*Example 3*

17.5 g. (0.1 mol) of acetamino-malonic acid-monomethyl ester are treated with 11.6 g. (0.2 mol) of propionaldehyde and 10.0 g. (0.1 mol) of triethyl amine. The semi-ester dissolves with slight evolution of gas. After standing at room temperature for 24 hours, the mass is evaporated down on a water bath in vacuo to a yellow syrup which is treated with 50 cc. of concentrated aqueous HCl and boiled under reflux for one hour. It is evaporated down on the water bath in vacuo to a dark brown syrup which is treated with concentrated aqueous NH₃ to a pH of 9 and then evaporated to dryness on a water bath in vacuo. After dissolving the crystalline residue forming a slurry in 60 cc. of water, it is boiled with animal charcoal for 20 minutes, filtered and the hot filtrate treated with 85 cc. of absolute alcohol. After standing overnight with cooling, the 2-hydroxy-norvaline separates in crystalline form. The product is filtered off with suction, washed twice with a little absolute alcohol and subsequently once with absolute ether. The yield amounts to 5.8 g. (43.6% of the theoretical). M.P. 231° C. with decomposition.

$C_5H_{11}NO_3$ (133.15). Calculated: C=45.10%, H=8.33%, N=10.52%. Found: C=45.28%, H=8.46%, N=10.99%.

When the propionaldehyde is replaced by the equivalent amount of butyraldehyde (14.4 g.), there are obtained in analogous manner 7.6 g. of 2-hydroxy-norleucine (51.3% of the theoretical) of M.P. 228° C. (from water).

$C_6H_{13}NO_3$ (147.17). Calculated: C=48.96%, H=8.90%, N=9.52%. Found: C=48.93%; H=8.91%, N=9.75%.

*Example 4*

7.0 g. (0.04 mol) of acetamino-malonic acid-monomethyl ester are treated with 4.0 g. (0.04 mol) of freshly distilled benzaldehyde and 4.0 g. (0.40 mol) of triethyl amine. 20 cc. of alcohol are added as solvent. After combining the components a slight evolution of gas is observed.

The mixture is allowed to stand at room temperature for 6 days, and triethyl amine ald alcohol are then evaporated off on water bath under vacuum. The residual yellowish oil solidifies within 24 hours forming a crystalline slurry from which by recrystallization from methanol and water, 4.8 g. of a solid substance of M.P. 134–136° C. are obtained. The result of the analysis is identical with that of the N-acetylphenyl-serine-ethyl ester. In admixture with authentic N-acetyl-phenyl-serine-ethyl ester no depression of the melting point can be observed.

$C_{13}H_{17}NO_4$ (251.3). Calculated: C=62.14%, H=6.82%, N=5.57%. Found: C=62.03%, H=6.93%, N=5.53%.

*Example 5*

3.8 g. (0.02 mol) of acetamino-malonic acid-monoethyl ester are treated with 3.0 g. (0.02 mol) of p-nitro-benzaldehyde, 2.0 (0.02 mol) triethyl amine and 10 cc. of absolute ethanol. A noticeable evolution of gas sets in immediately, and the colour of the solution turns via a dark green to dark yellow shade.

In the course of 16 hours the content of the reaction vessel solidifies forming a yellow crystalline cake which is soaked in absolute ether, filtered off with suction and washed twice with absolute ether. The yield of N-acetyl-p-nitrophenyl-serine-ethyl ester, after drying over CaCl₂ under vacuum, amounts to 4.2 g. corresponding to 70.2% of the theoretical. The product may readily be recrystallized from water/ethanol and then shows a M.P. of 147.5–148° C. Since there is no melting point depression with erythro-N-acetyl-p-nitrophenyl-serine-ethyl ester of M.P. 158° C. obtained and reported by G. W. Moersch et al., J. Amer. Chem. Soc. 74, 565 (1952), it mainly consists of the erthyro compound.

$C_{13}H_{16}N_2O_6$ (296.3). Calculated: C=52.70%, H=5.44%, N=9.46%. Found: C=52.80%, H=5.90%, N=9.71%.

Example 6

217 g. (1 mol) of acetamino-malonic acid-dimethyl ester are suspended in 500 cc. of absolute ethanol. A solution of 56 g. of KOH (1 mol) in 300 cc. of absolute ethanol are added thereto dropwise with stirring at room temperature within 2 hours. Stirring is continued at room temperature for 24 hours and a solution of 150 g. of 4-nitrobenzaldehyde (1 mol) in 750 cc. of dimethyl formamide is then added dropwise within one hour, stirred for a further half hour, and a solution of 138 g. of potassium carbonate in 400 cc. of $H_2O$ is then added dropwise within one hour. The mixture is stirred at room temperature for 48 hours, the precipitate ($KHCO_3$) filtered off with suction and the solvent evaporated off under vacuum. About 300 cc. of ethanol are poured on the viscous dark-brown residue and the mass is allowed to stand for 16 hours. The product crystallizing out is filtered off with suction, dissolved in a little $H_2O$, the solution filtered clearly and adjusted to a pH of 2–3 with dilute HCl. The precipitated product is sharply filtered off with suction. The crude product melts at 188–190° C. with decomposition and after recrystallizing once from water at 190–191° C. with decomposition. Yield: 125 g. or 46.5% of the theoretical.

$C_{11}H_{12}O_6N_2$ (268). Calculated: C=49.25%, H=4.51%, N=10.45%. Found: C=49.42%, H=4.61%, N=10.38%.

An equal quantity of alcohol may be used as solvent instead of dimethyl formamide.

The compound obtained in the above manner is the D,L-threo-N-acetyl-p-nitrophenyl-serine. The ethyl ester of M.P. 187° C. prepared therefrom in conventional manner, is identical with the N-acetyl-p-nitrophenyl-serine-ethyl ester obtained and reported by G. Ehrhart, Chem. Ber. 86, 485 (1953) with regard to melting point and mixed melting point.

Example 7

21.7 g. of acetylamino-malonic acid-diethyl ester (0.1 mol) are suspended in 50 cc. of absolute alcohol and the suspension is treated with stirring at room temperature within 2 hours with a solution of 5.6 g. of potassium hydroxide in 30 cc. of absolute alcohol. Stirring is continued at room temperature for 24 hours. To the solution thus obtained, having a weakly alkaline reaction, a solution of 15 g. of 4-nitrobenzaldehyde (0.1 mol) in 75 cc. of dimethyl formamide is then added dropwise within a half hour. The solution is stirred at room temperature for a further 48 hours, the separated bicarbonate is filtered off with suction, the solvent evaporated off under vacuum, and the residue rubbed with water whereupon the D,L-threo-N-acetyl-p-nitrophenyl-serine ethyl ester thus crystallises out. After re-precipitation from a little methanol the M.P. is 186–187° C. Yield 10 g. or 54% of the theoretical. According to melting point and mixed melting point, the product is identical with D,L-threo-N-acetyl-p-nitrophenyl-serine ethyl ester described in Example 6.

Example 8

A mixture of 18.9 g. (0.1 mol) of acetamino-malonic acid monomethyl ester, 50 cc. of alcohol and 10.7 g. (0.1 mol) of pyridine-4-aldehyde are mixed with stirring at room temeprature with 10 g. (0.1 mol) of triethyl amine. The mixture is allowed to stand at room temperature for 16 hours. After evaporating off the solvent, the reaction product crystallises upon standing in the refrigerator. Yield 19 g. or 75% of the theoretical of N - acetyl - β - [pyridyl - (4)] - serine ethyl ester, M.P. 130° C.

We claim:

1. Process for the production of α-amino-β-hydroxy-carboxylic acids, which comprises reacting an acylamino-malonic acid monoester with an aldehyde in an alkaline medium, hydrolyzing the α-acylamino-β-hydroxy-carboxylic acid ester thereby formed, and treating the hydrolized product to form a free α-amino-β-hydroxy-carboxylic acid.

2. Process according to claim 1 wherein said aldehyde is a member selected from the group consisting of formaldehyde, acetaldehyde, propionaldehyde, butyraldehyde, benzaldehyde, nitrobenzaldehyde and pyridine-4-aldehyde.

3. Process for the production of DL-serine, which comprises reacting acetamino-malonic acid-monomethyl ester with formaldehyde in the presence of triethylamine, hydrolyzing the corresponding ester thereby formed and recovering the free DL-serine from the hydrolyzed product.

4. Process for the production of threonine, which comprises reacting acetamino-malonic acid monomethyl ester with acetaldehyde in the presence of triethylamine, hydrolyzing the corresponding ester thereby formed, and recovering the free threonine from the hydrolyzed product.

5. Process for the production of 2-hydroxy-norvaline, which comprises reacting acetamino-malonic acid monomethyl ester with propionaldehyde in the presence of triethylamine, hydrolyzing the corresponding ester thereby formed, and recovering the 2-hydroxy-norvaline from the hydrolyzed product.

6. Process for the production of 2-hydroxy-norleucine, which comprises reacting acetamino-malonic acid monomethyl ester with butyraldehyde in the presence of triethylamine, hydrolyzing the corresponding ester thereby formed, and recovering the 2-hydroxy-norleucine from the hydrolyzed product.

7. Process for the production of N-acetyl-phenyl-serine-ethyl ester, which comprises reacting acetamino-malonic acid monomethylester with benzaldehyde in the presence of triethylamine, hydrolyzing the corresponding ester thereby formed, and recovering the N-acetyl-phenyl-serine-ethyl ester from the hydrolyzed product.

8. Process for the production of N-acetyl-p-nitro-phenyl-serine-ethyl ester, which comprises reacting acetamino-malonic acid mono-ethyl ester with p-nitro-benzaldehyde in the presence of triethylamine, then hydrolyzing the corresponding ester thereby formed, and recovering the N-acetyl-p-nitro-phenyl-serine-ethyl ester from the hydrolyzed product.

References Cited in the file of this patent

UNITED STATES PATENTS 2,530,065    King  ------------------  Nov. 14, 1950

OTHER REFERENCES

King: J.A.C.S., vol. 69, pages 2738–41 (1947).
Royals: Advanced Organic Chemistry, pages 780–85, Prentice Hall (1954).
Noller: Chemistry of Organic Compounds, 2nd edition, page 804, Saunders (1957).